April 26, 1932. R. R. GONSETT 1,855,742
ELECTROMAGNETIC MOTOR
Filed April 14, 1928 2 Sheets-Sheet 1
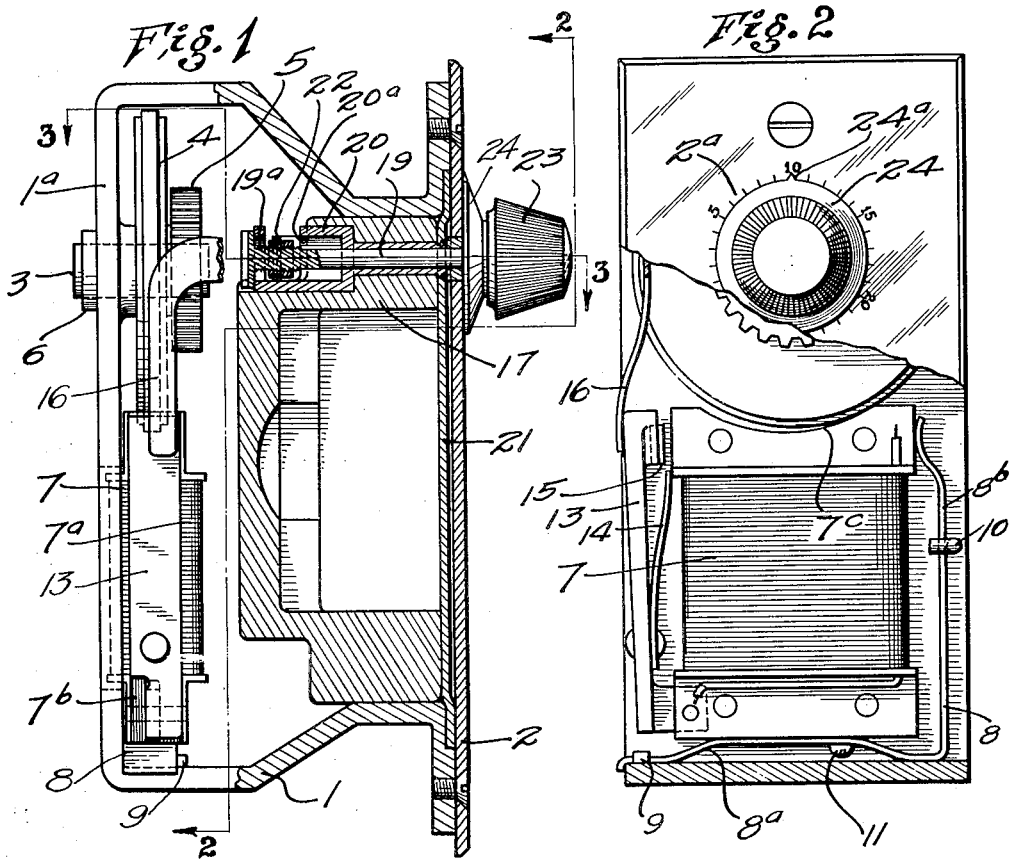
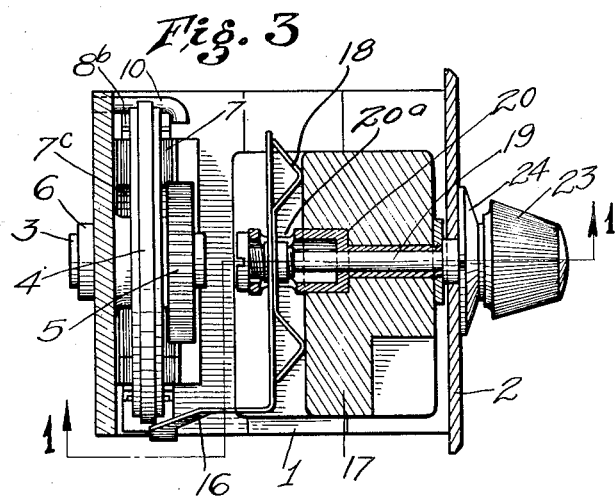
INVENTOR.
ROBERT R. GONSETT.
BY A. B. Bowman
ATTORNEY.

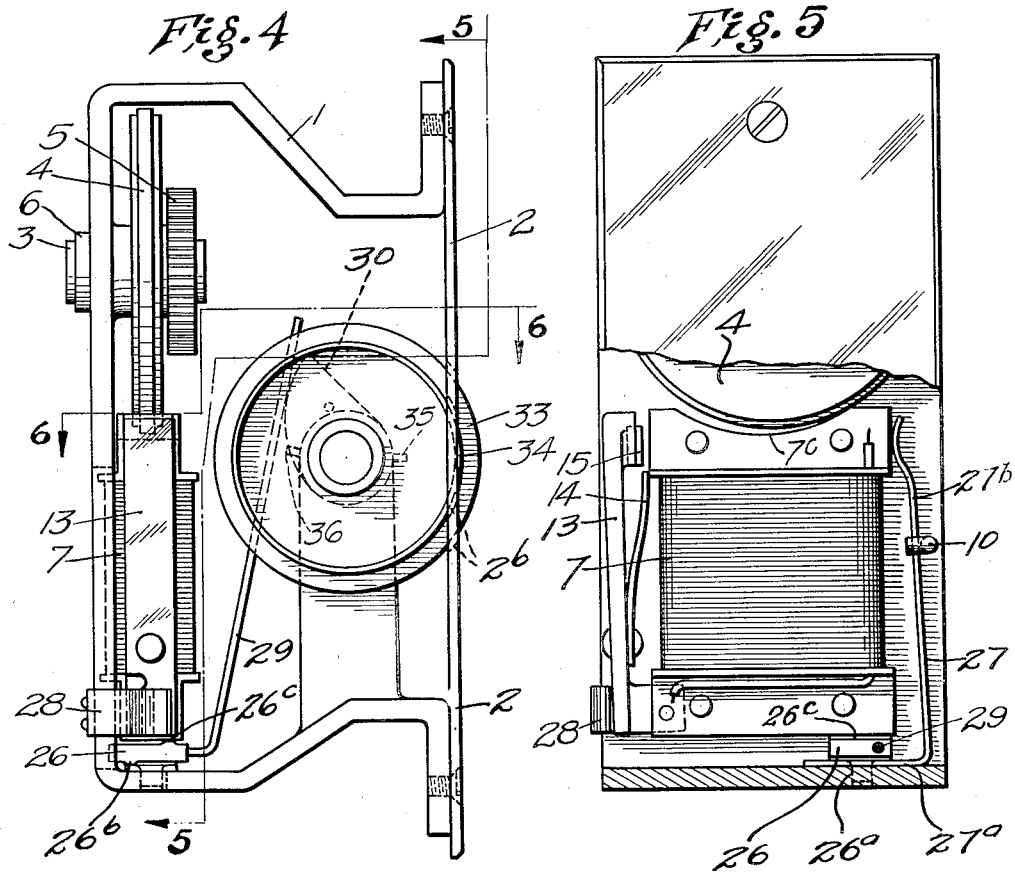
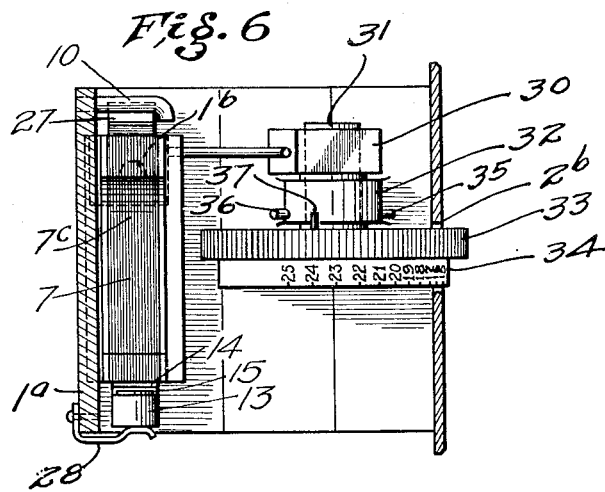

Patented Apr. 26, 1932

1,855,742

UNITED STATES PATENT OFFICE

ROBERT R. GONSETT, OF LOS ANGELES, CALIFORNIA

ELECTROMAGNETIC MOTOR

Application filed April 14, 1928. Serial No. 269,905.

My present invention relates to electric motors, more particularly to electro-magnetic motors.

The objects of this invention are: first, to provide an electric motor which can be operated at extremely low speeds and which is capable of furnishing sufficient and uniform power for many purposes; second, to provide a motor of this class, the speed of which may be easily and quickly adjusted to speeds between considerable limits; third, to provide a motor of this class which requires little power to operate the same so that the same may be connected in series with the electrical apparatus which it is adapted to operate; fourth, to provide novel means of transforming rapid reciprocating motion to relatively slow revoluble movement; fifth, to provide novel means for varying the force of the impulses and the length of stroke for varying the speed of the motor; sixth, to provide novel means for periodically setting the speed of the motor by manual means, as desired; and, seventh, to provide a motor of this class which is simple and economical of construction, durable, efficient and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon which form a part of this application in which:

Figure 1 is a partial sectional and partial elevational view of my motor in one form of construction with the section taken through 1—1 of Fig. 3; Fig. 2 is a partial front elevational and partial sectional view thereof taken at 2—2 of Fig. 1; Fig. 3 is a sectional view thereof taken through 3—3 of Fig. 1; Fig. 4 is a side elevational view of a slightly modified form of construction of my motor; Fig. 5 is a partial sectional and partial elevational view of the modified structure taken at 5—5 of Fig. 4; and, Fig. 6 is a sectional view thereof, taken through 6—6 of Fig. 4.

Like characters of reference refer to similar parts and portions throughout the views of the drawings.

The casing for my motor, as shown in both structures illustrated in the drawings, may be of any suitable form and is dependent primarily upon the mechanism with which it is used. As shown, the casing is in the form of a frame and consists of a U-shaped frame member 1 and a front plate 2 secured to the ends of the legs of the former.

Within the frame member 1 and on the back wall 1a thereof, or on the portion connecting the two leg portions of said member, is revolubly mounted a spindle 3 extending to the inner side of the frame member, on which is mounted the drive wheel 4 and also a drive member 5 preferably in the form of a gear. On the opposite end of the spindle 3 may be provided a collar 6 for retaining the spindle in position on the frame member.

Against the inner side of the portion 1a of the frame member 1 is movably positioned the electro magnet 7 which consists of a coil 7a and a laminated core 7b. The core is preferably mounted on an angularly shaped spring member 8 which is positioned against the inner side of the portion 1a of the frame 1 with its one leg against the lower leg of the frame, as shown best in Fig. 2. The spring member 8 is retained in position against the portion 1a of the frame member but permitted to move relative thereto by means of pins 9 and 10, the pin 9 being mounted in the lower leg of the frame member 1 near the end of the lower leg of the spring member, while the pin 10 is mounted on the portion 1a against the outer side and intermediate the ends of the other or upright leg of the spring member. The outer end of the pin 10 may be provided with a bent portion for retaining the upright leg of the spring member against the frame, as shown. The end of the lower leg of the spring member is preferably bent downwardly so as to engage the edge of the frame member 1 and to limit the inward movement of the electro-magnet toward the opposite side of the frame.

The lower leg of spring member is preferably offset upwardly in the form of and having the quality of a bow spring, as indicated by 8a, so as to provide a yieldable support for the electro-magnet, the core thereof being secured to this offset portion by a screw or other means 11.

The upper end of the other leg of the spring member 8, designated 8b, is positioned against one side of the upper end of the electro-magnet and exerts a constant resilient force against said end of the electro-magnet facilitated by the action of the spring 16. Thus the electro-magnet is permitted to move back and forth about its resilient pivotal mounting and adapted to be normally forced away from the pin 10.

The upper end of the core 7b is provided with a recess 7c into which a portion of the wheel 4 extends. This recess may be arcuate and so positioned relative to the wheel that the latter is engaged by only one side of the wall forming the recess, the core being forced against the wheel by the spring 8 and by the mutual attraction between the upper end of the core and an armature member 13 in a direction which is at an oblique angle to a line from the axis of the wheel to the center of oscillation of the magnet. In consequence, any motion produced in the magnet, and the force manifest against the wheel, when the magnet is energized will have a component coincident with a tangent of the wheel. This armature member is positioned at the side of the electro-magnet opposite the upright arm 8b of the spring 8 and is pivotally mounted at one end on the lower end of the core. The upper or free end of the member 13 is enlarged and normally forced in disengaged relation relative to the upper end of the core by a leaf spring 14 which is secured to the inner side and intermediate the ends of the member 13 and engages at its free end the upper end of the core. In the upper end of the member 13 may be provided a bumper or shock absorber 15 to reduce the noise and shock of the blow between the core and the free end of the armature member when the same are attracted. It will be noted that the spring 14 is of greater strength than the spring 8 so that as the tension of the spring 16 is increased, by the adjusting means, hereinafter described, above the tension of the spring 8 the force with which the core of the electromagnet 7 is held in engagement with the wheel 4, and the amplitude of vibration of the armature 13, is decreased.

The motor shown and described, is adapted for alternating current. When the current passes through the electro-magnet, the free ends of the electro-magnet and of the member 13 are attracted shifting the core of the electro-magnet against the wheel, imparting a blow against the peripheral portion of the wheel rotating the same a portion of a revolution. It will be noted that the blow is a slight physical contact made by reason of the spring 8 and the magnetic attraction between the core and the armature and the core and the wheel, though the latter source of power may be eliminated. It will be here noted that the wheel, when made of brass or other metal upon which magnetism has no effect, is not affected by any mutual attraction between the core and the wheel, but is affected by the mutual attraction between the core and armature. Since an alternating current is employed to energize the electromagnet 7 the armature is drawn toward the core of the electromagnet as the current increases from zero to its maximum value, either in a positive or negative direction. As the current decreases from its maximum value to zero the core and armature are forced apart by the spring 14 against the springs 8 and 16, but since the spring 16 is at all times of greater strength than the spring 8 the core will move away from its position at the time the magnet is deenergized, more rapidly than the armature will move away from the corresponding position at the time the magnet is energized. As the core moves it carries the wheel 4 with it in a counter clockwise direction, referring to Fig. 2, the core being held in engagement with the wheel 4 by reason of its resilient mounting on the lower portion of the spring 8, and disengaging the wheel as it approaches the end of its movement. It will be noted that the amplitude of movement of the armature and core, referred to above, is extremely slight, being hardly noticeable to the naked eye. As the current again increases to its maximum value in the opposite direction to that of the preceding half cycle of alternation of the current the above action of the core and armature is repeated; thus, there are two impulses imparted to the wheel 4 for each cycle of the alternating current; that is, when sixty cycle current is employed the wheel receives one hundred and twenty impulses each second.

In order to vary the speed of the wheel, I have provided a spring 16, the tension of which is adjustable. This spring is positioned to oppose the springs 8 and 14, thereby causing the free end of the armature to be positioned in closer proximity to the upper end of the core. This spring is mounted at one end on the supporting member 17, which in the particular application here shown is a switch casing, but the same may be directly supported on the upper leg of the frame member 1. The spring 16 preferably extends upwardly from the armature at the outer side thereof, then toward the supporting member 17, and thence across the back side thereof. Against the front side of the last named portion of the spring 16 is positioned another resilient member 18, shown best in Fig. 3, which member is adapted to retain the ends of the last mentioned portion of the spring 16 in substantially fixed positions, while the intermediate portion thereof is distorted, causing the portion of the spring 16 positioned against the back side of the member 17 to assume a curved shape drawing the portion in engagement with the armature 13 inwardly.

As here shown, the spring 16 is mounted intermediate its ends on a socket member or nut 22 which is mounted on a screw portion 19a at the inner end of the adjusting rod 19. This adjusting rod is revolubly mounted in a bushing 20 which is mounted in the support 17 and in this instance serves to secure the member 17 to a strap 21 used for supporting the member 17. The backwardly extended end of the bushing 20 is enlarged and the opposite sides thereof are cut away, as indicated by 20a, to permit the spring 16 and the resilient member 18 to extend to the opposite sides of the bushing, as shown in Figs. 1 and 3.

The rod 19 extends beyond the front side of the front plate 2 and is provided at said end with a knob 23. As the knob is rotated in one direction, the spring 16 is distorted and forced against the armature 13, shortening the space between the core and the armature, reducing the space of separation between the two and also the time of engagement between the two, and therefore reducing the movement of the core toward the wheel and the impact thereof against the wheel, and also the period during which the wheel is adapted to turn, resulting in slow speed in the wheel. When the knob is rotated in the opposite direction, the tension of the spring 16 is released resulting in greater speed in the wheel. At the inner end of the knob 23 is provided an index member 24 having an index finger 24a which finger rides over a dial 2a surrounding the index member on the outer side of the plate 2.

In the modified structure shown in Figs. 4, 5 and 6, the mounting of the wheel and drive member, the relation of the electromagnet therewith and the adjustment of the speed of the motor is similar to that shown in Figs. 1, 2 and 3 and the results obtained are substantially the same.

In the modified structure, however, the electromagnet 7 is loosely and pivotally mounted at one end of the lower edge of its core on an adjusting block 26. This adjusting block is provided with a downwardly extending stem 26a which is adapted to rock backwardly and forwardly in an elongated slot 1b in the lower leg of the frame 1, as shown in Figs. 4 and 6. Between the adjusting block 26 and the upper side of the lower leg of the frame 1, is loosely positioned the lower leg 27a of a spring 27. This spring member is functionally the same as the spring member 8 in the structure first described, but the lower leg 27a thereof does not yieldably support the electro-magnet in the modified structure. The pin 26a, holding the adjusting block 26 in position, also extends through the lower leg 27a of the spring member 27 and holds the lower portion of said spring in position relative to the frame member 1, the other leg 27b thereof holding the upper end of the core against the peripheral portion of the wheel 4. The lower end of the electromagnet is forced inwardly toward the upright leg 27b of the spring member 27 by a spring 28 which is secured to the portion 1a of the frame member 1, and extends with its free end forwardly and engages at its free end, the lower end of the armature 13 at its pivotal connection with the core of the electro-magnet.

At the under side of the adjusting block 26 and near the rear edge thereof is provided a pivot ridge or portion 26b which bears preferably against the upper side of the lower leg 27a of the spring member 27. At the upper side of this adjusting block and near the opposite edge thereof, is provided another pivot ridge or portion 26c which engages the under side of the core of the electro-magnet. At the front side of the adjusting block is provided a forwardly and upwardly extending stem 29 which is of resilient construction and yieldably engages the face of an adjusting cam 30, shown best in Figs. 4 and 6. The cam 30, as shown, is secured to one end of a spindle 31 which is revolubly mounted in a bracket or journal 32 extending upwardly from the lower leg of the supporting frame member 1. On the opposite end of said spindle and at the opposite side of the bracket 32 is secured the adjusting wheel 33 which is preferably knurled or serrated at its peripheral portion, as shown. To the adjusting wheel, and at the side thereof opposite the bracket 32, is secured a dial member 34 in the form of a drum. Both the adjusting wheel 33 and the drum 34 extend through an opening 2b in the front plate 2, as shown in Figs. 4 and 6, so that the adjusting wheel may be readily rotated from the front side of the enclosing frame or casing and so that the indices on the dial may be readily seen, a suitable hairline being provided on the outer side of the plate 2 for alignment with the indices.

On the bracket 32 may be provided stop pins 35 and 36 which may be engaged by an outwardly extending pin 37 on the adjusting wheel 33 for limiting the extreme positions of the wheel 33, the pin 35 limiting the high speed of the motor and the pin 36 limiting the low speed thereof.

Though I have shown and described a particular construction, combination and arrangement of parts and portions, and a certain modification thereof, I do not wish to be limited to this particular construction, combination and arrangement, nor to the modification, but desire to include in the scope of my invention the construction, combination and arrangement substantially as set forth in the appended claims.

Having thus described my invention, what I claim as new and desire to secure by Letters Patent is:

1. In a motor of the class described, a supporting means, a revoluble member mounted on said supporting means, an electro-magnet, adapted to be energized by an alternating current, yieldably mounted on said supporting means adapted periodically to engage said revoluble member for periodically rotating the same portions of a revolution, and a counteracting armature in association with the electromagnet adapted to be attracted thereby.

2. In a motor of the class described, a supporting means, a revoluble member mounted thereon, an electro-magnet, adapted to be energized by an alternating current, yieldably mounted on said supporting means adapted periodically to engage said revoluble member, spring means normally forcing said electro-magnet into engagement with said revoluble member, an armature member pivotally mounted at one end on said electro-magnet and adapted periodically to have its opposite end drawn toward the opposite end of said electro-magnet, and a spring normally separating the free end of said armature from the adjacent end of said electro-magnet.

3. In a motor of the class described, a supporting means, a revoluble member mounted thereon, an electro-magnet, adapted to be energized by an alternating current, yieldably mounted on said supporting means adapted periodically to engage said revoluble member, spring means normally forcing said electro-magnet into engagement with said revoluble member, an armature member pivotally mounted at one end on said electro-magnet and adapted periodically to have its opposite end drawn toward the opposite end of said electro-magnet, a spring normally separating the free end of said armature from the adjacent end of said electro-magnet, and means for varying the relative movement of said electro-magnet and said armature.

4. In a motor of the class described, a supporting means, a revoluble member mounted thereon, an electro-magnet, adapted to be energized by an alternating current, yieldably mounted on said supporting means adapted periodically to engage said revoluble member, spring means normally forcing said electro-magnet into engagement with said revoluble member, an armature member pivotally mounted at one end on said electro-magnet and adapted periodically to have its opposite end drawn toward the opposite end of said electro-magnet, a spring normally separating the free end of said armature from the adjacent end of said electro-magnet, and spring means positioned to oppose the action of the first mentioned spring means and said spring.

5. In a motor of the class described, a supporting means, a revoluble member mounted thereon, an electro-magnet, adapted to be energized by an alternating current, yieldably mounted on said supporting means adapted periodically to engage said revoluble member, spring means normally forcing said electro-magnet into engagement with said revoluble member, an armature member pivotally mounted at one end of said electro-magnet and adapted periodically to have its opposite end drawn toward the opposite end of said electro-magnet, a spring normally separating the free end of said armature from the adjacent end of said electro-magnet, spring means positioned to oppose the action of the first mentioned spring means and said spring, and means for varying the tension of said last mentioned spring means, and the relative movement of said armature and electro-magnet.

6. In a motor of the class described, a frame, a wheel revolubly mounted thereon, an electro-magnet, adapted to be energized by an alternating current, comprising a coil and a core positioned therein, said core having a recess at one end adapted to receive a portion of said wheel, said core being adapted to engage said wheel at one side of the recess of the core, and means for periodically forcing said core into disengaged relation relative to said wheel.

7. In a motor of the class described, a frame, a wheel revolubly mounted thereon, an electro-magnet, adapted to be energized by an alternating current, comprising a coil and a core positioned therein, said core having a recess at one end adapted to receive a portion of said wheel, said core being adapted to engage said wheel at one side of the recess of the core, resilient means forcing said core in engagement with said wheel, an armature pivotally mounted relative to said core and with one end connected to one end of the core with its other end free to move relative to the other end of the core, and a spring normally forcing the free end of the armature from the adjacent end of the core.

8. In a motor of the class described, a frame, a wheel revolubly mounted thereon, an angular spring member loosely mounted on said frame at one side of said wheel with one leg thereof extending toward said wheel and the other leg thereof having an offset portion, an electro-magnet, adapted to be energized by an alternating current, comprising a coil and a core, the one end of the core thereof being secured to the offset portion of said spring member and the other end thereof extending toward said wheel and forced into engagement therewith by the leg of the spring member extending toward the wheel, said core being adapted to be periodically disengaged from said wheel.

9. In a motor of the class described, a frame, a wheel revolubly mounted thereon, an angular spring member loosely mounted on said frame at one side of said wheel with one leg thereof extending toward said wheel and the other leg thereof having an offset portion, an electro-magnet, adapted to be energized by an alternating current, comprising a coil and a core, the one end of the core thereof being secured to the offset portion of said spring member and the other end thereof extending toward said wheel and forced into engagement therewith by the leg of the spring member extending toward the wheel, an armature pivotally mounted at the end of the core connected with said spring member with the other end thereof extending toward and positioned to one side of the end of the core in engagement with said wheel, and a spring normally separating the free end of the armature from the free end of the core.

10. In a device of the character described the combination with a rotatable member of a vibratory electromagnet and means for energizing the magnet periodically, to cause vibration of the magnet, the electromagnet being so disposed that in vibrating an element of the magnet impinges on the periphery of the member in a direction oblique to the line between the center of rotation of the member and the center of oscillation of the electromagnet.

11. A device of the character described consisting of a movable member having a driven surface and mounted for movement of said surface in a fixed path, a coil, a coil-mounting, an armature, said coil and coil mounting as one operating element and said armature as a second operating element being relatively movable, one of said operating elements being mounted and adapted for movement in electromagnetic response to energization of the coil to impinge said driven surface with a motion oblique to said path and being a complete inelastic structure from its mounting to the point of impingement, means to periodically energize the coil, and yielding means to move the operating elements to relative initial positions.

12. In a device of the character described, a movable member having a driven surface and mounted for movement of said surface in a fixed path, a vibratory electromagnet and means for energizing the magnet periodically to cause vibration, the electromagnet being so disposed that in vibrating an element of the magnet impinges on the driven surface in a direction oblique to the said path.

In testimony whereof, I have hereunto set my hand at Los Angeles, California, this 28th day of March, 1928.

ROBERT R. GONSETT.